United States Patent
Borker

(10) Patent No.: US 9,164,947 B1
(45) Date of Patent: Oct. 20, 2015

(54) METHOD AND SYSTEM FOR INSERTING COOKIES IN I/O COMMANDS

(71) Applicant: QLOGIC, Corporation, Aliso Viejo, CA (US)

(72) Inventor: Gaurav Borker, Goa (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 369 days.

(21) Appl. No.: 13/782,673

(22) Filed: Mar. 1, 2013

Related U.S. Application Data

(60) Provisional application No. 61/734,776, filed on Dec. 7, 2012.

(51) Int. Cl.
    *G06F 13/42* (2006.01)

(52) U.S. Cl.
    CPC .................................. *G06F 13/4282* (2013.01)

(58) Field of Classification Search
    USPC ........................................................ 710/105
    See application file for complete search history.

(56) References Cited

U.S. PATENT DOCUMENTS

| | | | |
|---|---|---|---|
| 5,260,933 A * | 11/1993 | Rouse ............................ | 370/216 |
| 5,590,122 A * | 12/1996 | Sandorfi et al. ................ | 370/394 |
| 5,604,744 A * | 2/1997 | Andersson et al. ............ | 370/347 |
| 5,822,606 A * | 10/1998 | Morton ........................... | 712/16 |
| 6,081,847 A * | 6/2000 | Lin ................................. | 709/250 |
| 6,229,822 B1 * | 5/2001 | Chow et al. .................... | 370/474 |
| 6,310,884 B1 * | 10/2001 | Odenwald, Jr. ................ | 370/412 |
| 6,411,617 B1 * | 6/2002 | Kilkki et al. ................... | 370/353 |
| 6,721,320 B1 * | 4/2004 | Hoglund et al. ............... | 370/392 |
| 6,751,665 B2 * | 6/2004 | Philbrick et al. .............. | 709/224 |
| 6,826,123 B1 * | 11/2004 | Herring ........................... | 368/46 |
| 7,558,264 B1 * | 7/2009 | Lolayekar et al. ............ | 370/392 |
| 7,720,064 B1 * | 5/2010 | Rohde ............................ | 370/389 |
| 8,396,981 B1 * | 3/2013 | Lee et al. ...................... | 709/232 |
| 8,422,359 B2 * | 4/2013 | Nakajima ...................... | 370/217 |
| 8,625,623 B2 * | 1/2014 | Saklecha et al. ............... | 370/413 |
| 2002/0015405 A1 * | 2/2002 | Sepponen et al. ............. | 370/389 |
| 2003/0163590 A1 * | 8/2003 | Cheng ........................... | 709/250 |
| 2004/0017784 A1 * | 1/2004 | Backlund ...................... | 370/256 |
| 2005/0117522 A1 * | 6/2005 | Basavaiah et al. ............ | 370/252 |
| 2006/0023751 A1 * | 2/2006 | Wilson et al. ................. | 370/474 |
| 2006/0034284 A1 * | 2/2006 | Saklecha et al. .............. | 370/392 |
| 2007/0076685 A1 * | 4/2007 | Seto ............................... | 370/351 |
| 2008/0004022 A1 * | 1/2008 | Johannesson et al. ........ | 455/436 |
| 2009/0106470 A1 * | 4/2009 | Sharma et al. ................ | 710/301 |
| 2010/0088434 A1 * | 4/2010 | Dang et al. .................... | 710/30 |
| 2011/0182119 A1 * | 7/2011 | Strasser et al. ........... | 365/185.03 |
| 2012/0155349 A1 * | 6/2012 | Bajic et al. .................... | 370/311 |

FOREIGN PATENT DOCUMENTS

EP          709767 A1 *  5/1996  ............. G06F 9/318

* cited by examiner

*Primary Examiner* — Paul R Myers

(74) *Attorney, Agent, or Firm* — Klein, O'Neill & Singh, LLP

(57) ABSTRACT

A system having an initiator adapter coupled to a computing system and communicating with a target adapter coupled to a target controller managing a plurality of storage devices is provided. The initiator adapter initiates an input/output (I/O) request for the target adapter; assigns an exchange identifier for processing the I/O request and embeds a cookie in the exchange identifier for performing a function. The target adapter then sends a response to the I/O request to the initiator adapter with the exchange identifier and the cookie; and the initiator adapter extracts the cookie from the exchange identifier received from the target adapter.

20 Claims, 6 Drawing Sheets

METHOD AND SYSTEM FOR INSERTING COOKIES IN I/O COMMANDS

CROSS-REFERENCE TO RELATED APPLICATIONS

This application claims priority under 35 U.S.C. §119(e) to U.S. Provisional Patent Application Ser. No. 61/734,776, filed on Dec. 7, 2012, the disclosure of which is incorporated herein by reference in its entirety.

TECHNICAL FIELD

The present disclosure relates to computing systems and devices.

BACKGROUND

A computer network, often referred to simply as a network, is a group of interconnected computing devices that facilitates communication among users and allows users to share resources, for example, storage space at storage devices using a storage area network (SAN). Adapters, switches, and routers may be used to interconnect network devices.

Initiators are used to send input/output (I/O) requests for storing or reading data at storage devices that are managed by a target controller. An initiator may be an adapter coupled to a computing system that sends out I/O requests for reading or writing data. A target may be an adapter coupled to the target controller that provides a response to the I/O request. Various transport protocols, for example, Fibre Channel, Fibre Channel over Ethernet, iSCSI (Internet over Small Computer System Interface) and others are used for sending I/O requests. Continuous efforts are being made to improve I/O processing.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, an initiator adapter coupled to a computing system and communicating with a target adapter coupled to a target controller managing a plurality of storage devices is provided. The initiator adapter initiates an input/output (I/O) request for the target adapter; assigns an exchange identifier for processing the I/O request and embeds a cookie in the exchange identifier for performing a function. The target adapter then sends a response to the I/O request to the initiator adapter with the exchange identifier and the cookie; and the initiator adapter extracts the cookie from the exchange identifier received from the target adapter.

In another embodiment, a machine implemented method is provided. The method includes initiating a read command by an initiator adapter coupled to a computing system and communicating with a target adapter coupled to a target controller managing a plurality of storage devices; assigning an exchange identifier for processing the read command and embedding a cookie in the exchange identifier for performing a function; receiving a data protocol data unit (PDU) with the exchange identifier with the embedded cookie from the target adapter at the initiator adapter; and extracting the cookie from the exchange identifier received with the data protocol data unit.

In yet another embodiment, a machine implemented method is provided. The method includes initiating a write command by an initiator adapter coupled to a computing system and communicating with a target adapter coupled to a target controller managing a plurality of storage devices; assigning a first exchange identifier by the initiator adapter for processing the write command and embedding a first cookie in the exchange identifier for performing a function; receiving a response from the target adapter at the initiator adapter with the first cookie and the first exchange identifier and a second cookie and a second exchange identifier assigned by the target adapter, the response indicating that the target adapter is ready to receive data for the write command.

The method further includes sending a data protocol data unit to the target adapter with the second exchange identifier and the second cookie; extracting the second cookie from the data protocol unit and processing the data protocol data unit by the target adapter; sending a status protocol data unit from the target adapter to the initiator adapter with the first exchange identifier and the first cookie; and extracting the first cookie from the first exchange identifier received with the status protocol data unit by the initiator adapter from the target adapter.

This brief summary has been provided so that the nature of the disclosure may be quickly understood. A more complete understanding of the disclosure can be obtained by reference to the following detailed description of the various embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
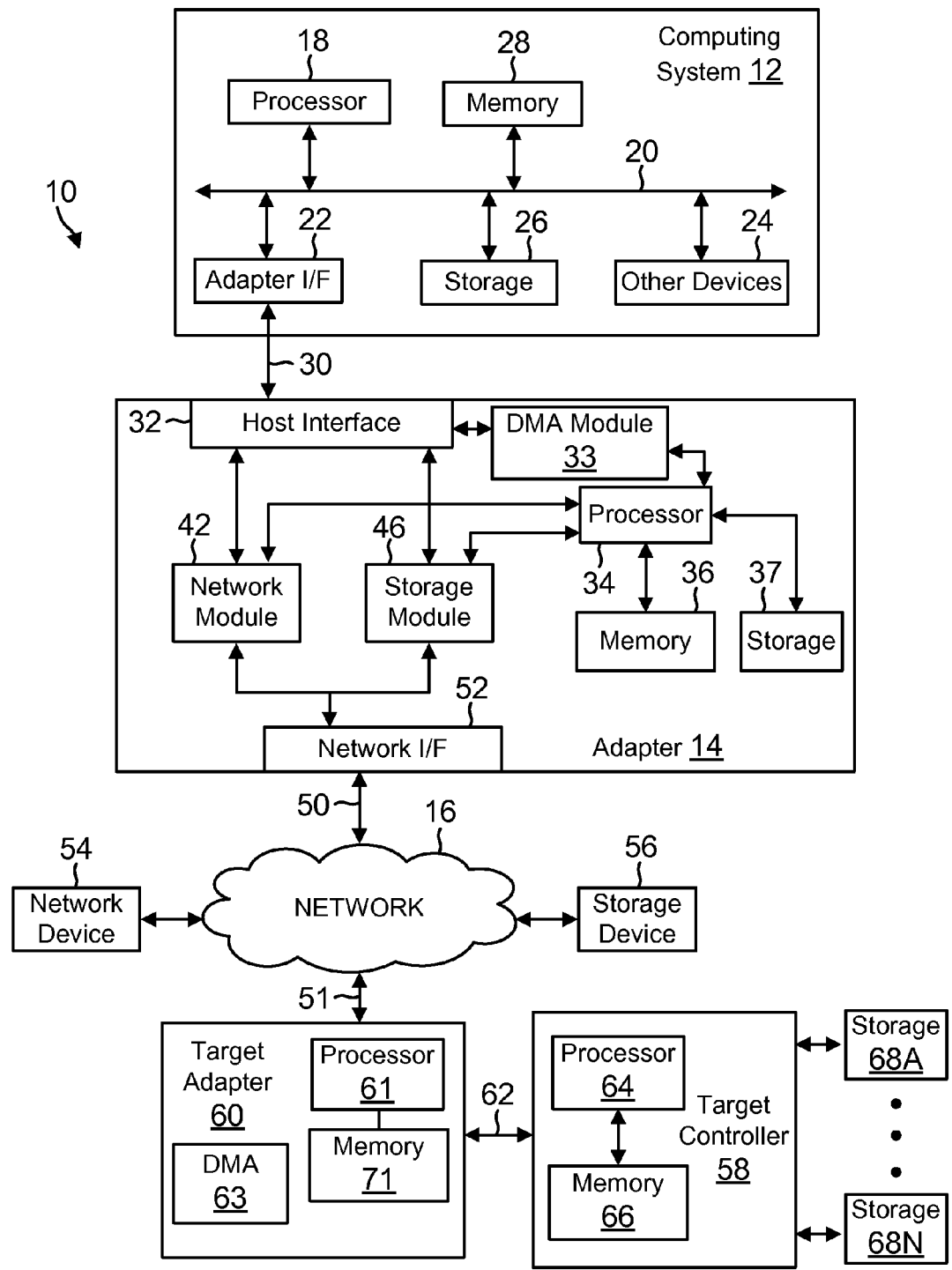
FIG. 1A is a system diagram showing components using the embodiments of the present disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.). The embodiments disclosed herein may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

FIG. 1A is a block diagram of a system 10 configured for use with the present embodiments. The system 10 may include one or more computing system 12 (may also be referred to as "host system 12" or server 12) coupled to an adapter 14 (may also be referred to as initiator adapter 14) that interfaces with a network 16. The network 16 may include, for example, additional computing systems, servers, storage systems, etc.

The computing system 12 may include one or more processors 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing system 12 may further include a local storage device 26, which may be for example a hard disk, a CD-ROM, a non-volatile memory device (flash or memory stick) or any other device. Storage 26 may store operating system program files, application program files, and other files. Some of these files are stored at storage 26 using an installation program. For example, the processor 18 may execute computer-executable process steps of an installation program so that the processor 18 can properly execute the application program. The computing system 12 also includes other devices and interfaces 24, which may include a display device interface, a keyboard interface, a pointing device interface and others.

The adapter 14 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (may be referred to as FC). Fibre Channel Protocol (FCP) is a standard transport protocol for delivering serial Small Computer Systems Interface (SCSI) commands over Fibre Channel interconnects. FCP is designed to operate in a highly-efficient manner using hardware for protocol offload engines (POEs).

Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage high Ethernet networks (for example, 10 Gigabits) while preserving the Fibre Channel protocol.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command data blocks (CDBs) to SCSI storage devices (may be referred to as targets) on remote servers. iSCSI is a SAN based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

The iSCSI and FCP architecture is based on a client/server model. Typically, the client is a host computing system such as a file server that issues a read or write command using an adapter. The server may be a disk array that responds to the client request.

The following introduces some of the basic terms used in an iSCSI and FCP data transfer: (a) "Exchange" means the operations needed to perform an iSCSI (or FC/FCoE) data read or write. An exchange typically includes three operational phases: command phase, data movement phase and response phase. (b) "Initiator"—Typically the client is the initiator that initiates a read or write command. (c) "Target"—Typically a storage array that accepts a read or write command and performs the requested operation.

In a typical FCP/iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete.

Commands are sent by the host computing system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request.

With continued reference to FIG. 1A, computing system 12 includes an adapter interface 22 that couples computing system 12 to the adapter 14 via a link 30. The adapter 14 interfaces with the computing system 12 via the link 30 and a host interface 32. In one embodiment, the host interface 32 may be a PCI Express interface coupled to a PCI Express link (for example, 30).

The adapter 14 may also include a processor 34 that executes firmware instructions out of memory 36 to control overall adapter 14 operations. Direct memory access (DMA) module 33 may be used by adapter 14 to control access to link 30 for performing DMA operations, e.g. to send data to processor 18 or receive data from processor 18.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one embodiment, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56 and 68A-68N. The storage module 46 may further include memory buffers (not shown) to temporarily store information received from the storage devices 56 and transmitted by the adapter 14 to the storage devices 56 and 68A-68N. In one embodiment, the storage module 46 is configured to process storage traffic according to the Fibre Channel storage protocol, or any other protocol, for example, iSCSI.

The adapter 14 also includes a network interface 52 that interfaces with a link 50 via one or more ports (not shown). The network interface 52 includes logic and circuitry to receive information via the link 52 and pass it to either the network module 42 or the storage module 46.

The adaptive embodiments of the present disclosure are not limited to adapter 14 having both and separate network and storage modules. For example, adapter 14 may have an integrated module that can handle either network and storage traffic, or adapter 14 may only have a storage module similar to a host bus adapter.

Adapter 14 may operate as an "initiator" for sending out input/output (I/O) requests to a target controller 58 via a target adapter 60. The target adapter 60 is similar to the initiator adapter 14 and includes a processor 61 that has access to memory 71 that may be used to store firmware instructions or any other instruction. Target adapter 60 is coupled to network 16 via a link 51 similar to link 50. Target adapter 60 is coupled to the target controller 58 via a link 62 similar to link 30 described above. Target adapter 60 includes a DMA module 63 that manages access to link 62 to send and receive data using DMA transfer operations. Target controller 58 may be a computing system similar to computing system 12 having a processor 64 and a memory 66. Target controller 58 manages storage devices 68A-68N for reading and writing data for I/O requests.

Figure 1B:
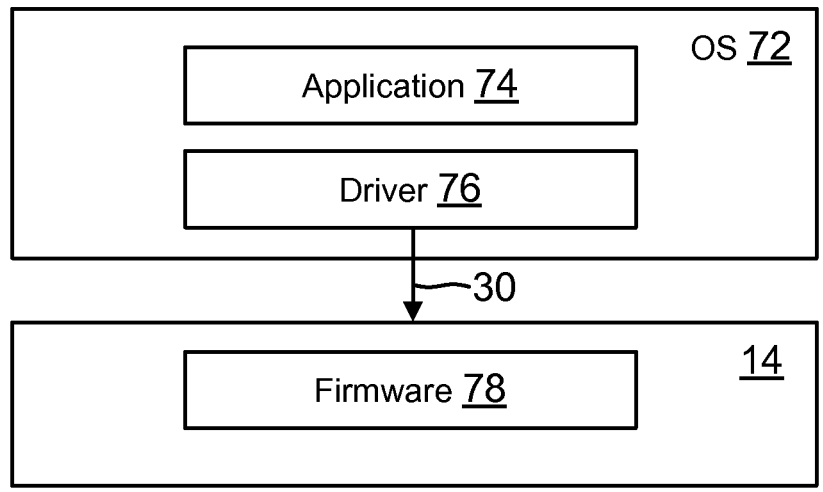
FIG. 1B is a block diagram of a software architecture used by the system of the present disclosure.

FIG. 1B shows a software architecture that may be used by the components of system 10. For example, the software architecture of FIG. 1B includes an operating system (OS) 72 that controls the overall operation of a computing system, for example, 12 and target controller 58. OS 72 may be Windows based, Linux based, Solaris based or any other OS type.

A computing system may execute an application 74. Application 74 when executed by computing system 12 may be a client application, for example, a database application, web server, e-mail application, and others. Application 74 may be used to generate a request to read and write information.

Application 74 may also be a management application executed by a computing system used as a management console (not shown) for managing the various components of system 10. In one embodiment, application 74 may be used to configure a storage space as a logical entity (logical unit number (LUN). Each LUN is uniquely identified by an identifier (LUN ID) and is associated with physical storage space. A LUN is typically divided into logical block addresses (LBAs) that are used by an application to read and write data to storage locations. The LBAs are mapped with actual physical storage to read and write data. To generate an I/O request to read or write data at a storage location, adapter 14 uses a LUN identifier and LBA range.

Application 74 when executed by a target controller 58 may be an application for managing various storage devices 68A-68N. To communicate with adapter 14 (or 60), application 74 uses a driver 76. The driver may be referred to as an adapter driver. To control the operations of adapter 14 (and target adapter 60), an adapter processor executes firmware instructions 78 out of adapter memory (36 or 71).

In one embodiment, a method and system is provided to use a transport layer (for example, FC, FCoE, iSCSI and others) to obtain information regarding a particular I/O Exchange. Typically, an I/O exchange is used to read or write data using a SCSI based transport protocol. Each Exchange is identified by a unique identifier, referred to as Exchange Identifier or "XID", throughout this specification. The XID may be assigned by an initiator or a target, as described below in detail. A cookie may be embedded in the XID in a read/write command or a transfer-ready command. The transfer ready command is typically sent by a target adapter when it is ready to receive data. The cookie may be used for different functions, as described below in more detail. A receiver that embedded the cookie either in a command PDU or a transfer ready PDU can then extract the cookie from the XID and use it to perform a function.

Figure 2A:
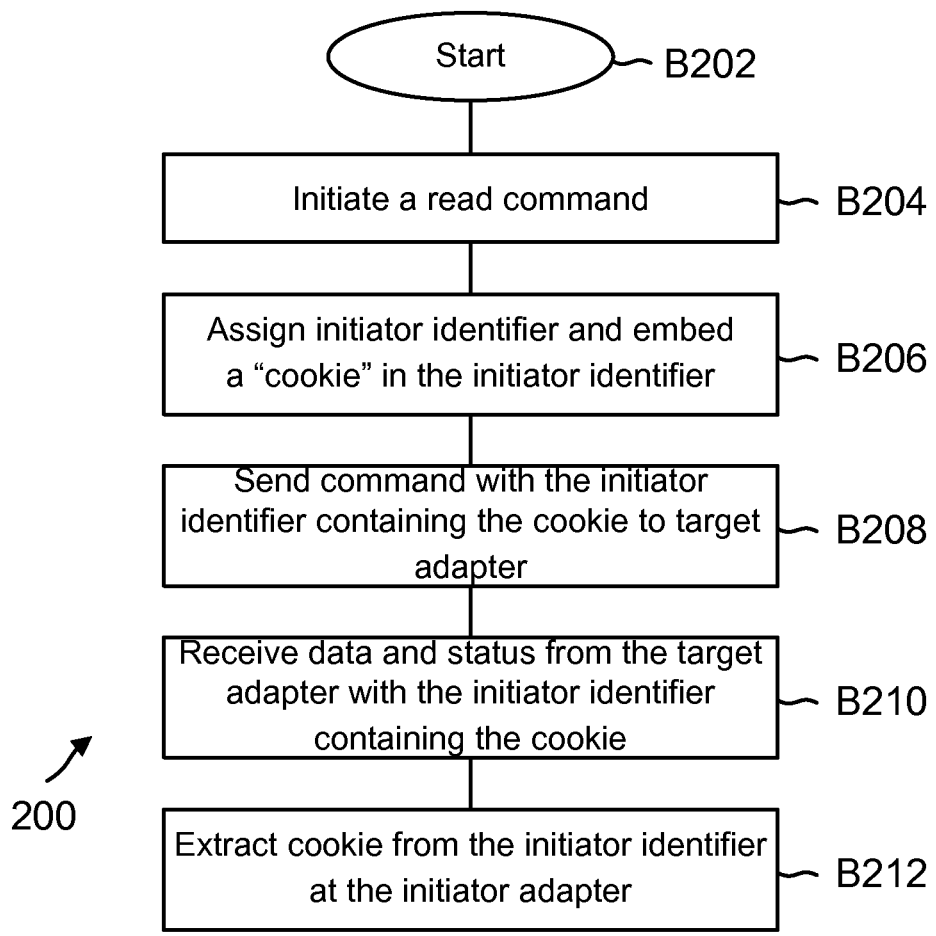
FIG. 2A is a process flow for a read request, according to one embodiment.

FIG. 2A shows a process 200 for embedding a cookie ($C_x$) in a read command block (referred to as a protocol data unit (PDU)). The process typically occurs in multiple phases, namely, a command phase, a data phase and a status phase. Each Exchange is allocated an XID by the initiator. The cookie is embedded in the XID, as described below in detail.

The process 200 begins in block B202, when initiator adapter 14 is functional and operating. A read command is initiated in block B204. The read command may be initiated by application 74 (FIG. 1B). The driver 76 creates a command block for the read request and notifies the initiator adapter 14 of the command block.

In block B206, the initiator adapter 14 assigns an identifier XID (may be referred to as initiator XID) for the Exchange. The initiator adapter 14 also inserts a cookie $C_x$ in the initiator XID. The cookie may be inserted for performing a function or for setting a parameter. The cookie may also be set to enable an operation. The cookie may also be used to select a processor or a hardware device for performing a function. In block B208, the read command and XID with the cookie is then sent to the target adapter 60.

In block B210, first a data PDU and then a status PDU, indicating completion of the read request is sent by the target adapter 60. The target adapter 60 also sends the initiator XID X with the cookie $C_x$ to the initiator adapter 14. The initiator adapter 60 extracts the cookie $C_x$ from the XID.

Figure 2B:
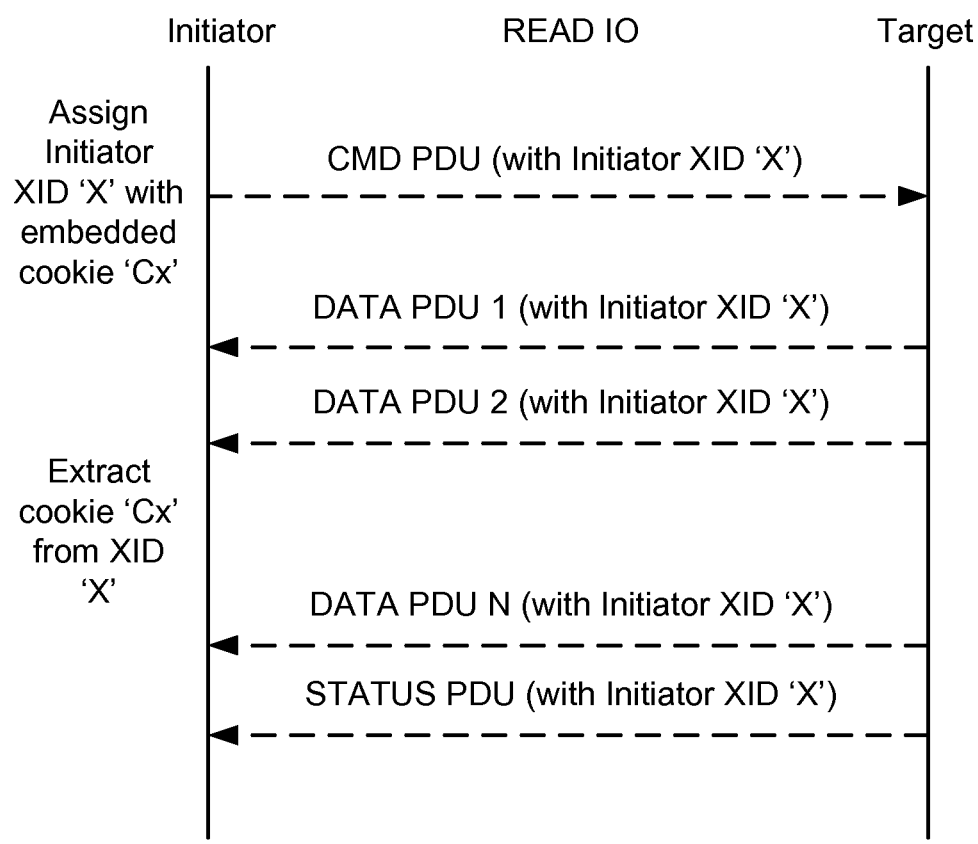
FIG. 2B shows an example of using the process flow of FIG. 2A.

FIG. 2B illustrates the various process blocks of FIG. 2A. A read exchange comprises of a command PDU (from initiator adapter 14 to target adapter 60), one or more data PDUs (target adapter 60 to initiator adapter 14) and Status PDU (target adapter 60 to initiator adapter 14). The initiator XID X, assigned by the initiator adapter during the command phase is echoed back in the data and status PDUs that are received by the initiator adapter from the target adapter. Cookie $C_x$ is embedded in the initiator XID during the command phase. On receiving ingress PDUs, cookie $C_x$ can be extracted back from the initiator XID X.

Figure 3A:
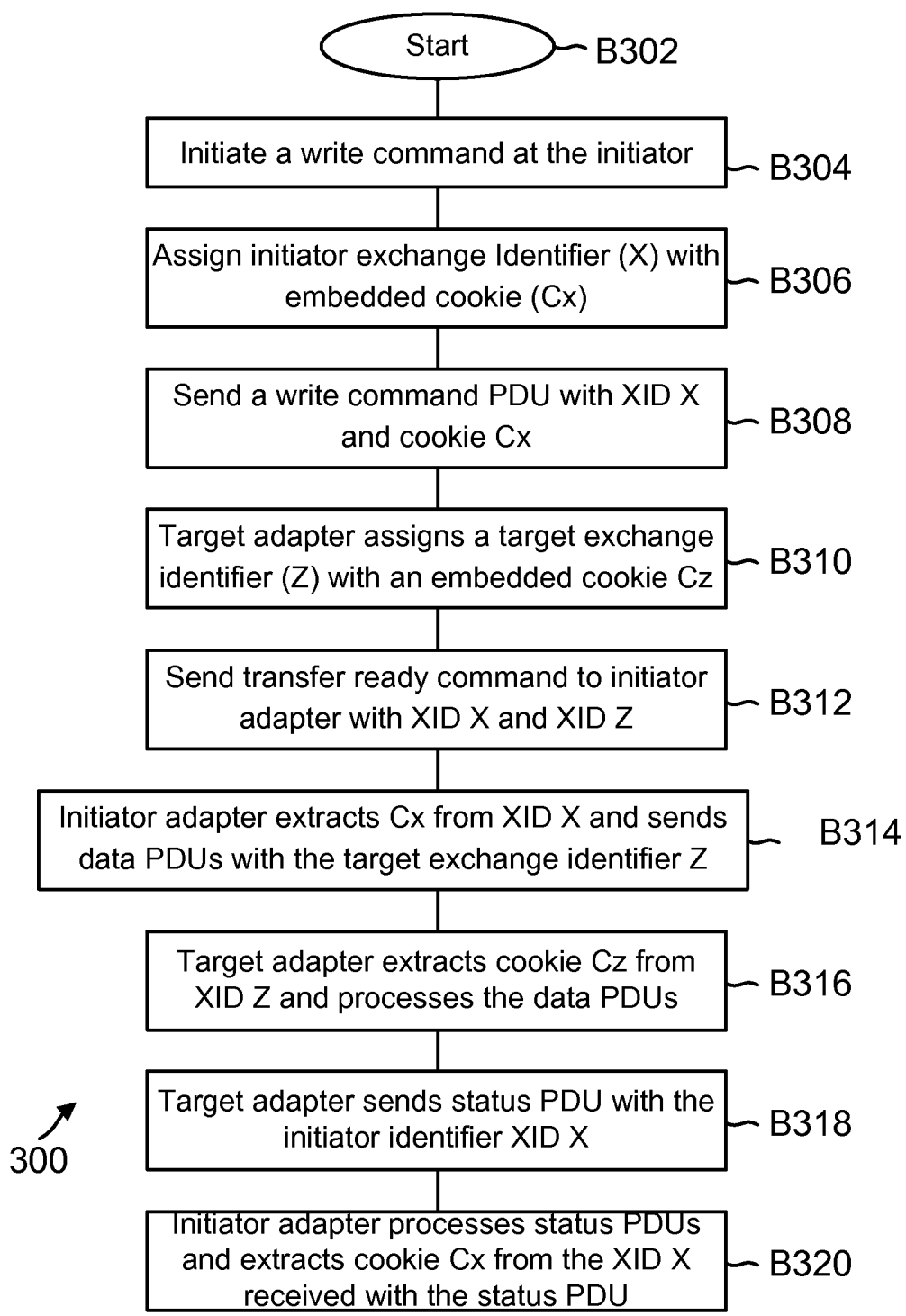
FIG. 3A shows a process for managing write requests, according to one embodiment.

FIG. 3A shows a process 300 for handling write requests and using embedded cookies in XIDs. The write process includes a command phase where an initiator adapter sends a write command PDU to a target adapter; the target adapter then sends a transfer ready (Xfer Rdy) PDU to the initiator indicating that the target is ready to accept the data for the write request. The initiator adapter then sends one or more data PDUs with the data that needs to be written at a storage device. Once the data is written, a status PDU is provided by the target adapter.

The initiator adapter during the command phase selects an initiator XID, for example, X (may also be referred to as first exchange identifier). The target adapter sends the initiator XID X back to the initiator in Xfer Rdy and Status PDUs. The target adapter may also select a target XID Z (may also be referred to as the second exchange identifier) for the Xfer Rdy phase. The initiator adapter sends the target XID Z in data PDUs to the target adapter.

In one embodiment, the initiator adapter may insert a cookie $C_x$ in the initiator XID X and the target adapter may insert a cookie $C_z$ in the target XID Z. The initiator adapter may extract the cookie $C_x$ when it receives a PDU from the target adapter, while the target adapter may extract the cookie $C_z$ from a PDU that it receives from the initiator adapter.

Referring now to FIG. 3A, process 300 begins in block B302, when initiator adapter 14 and target adapter 60 are operational. Application 74 is also operational at a computing system to issue a write command. In one embodiment, in block B304, application 74 issues a write CDB and places it at memory 28. The write CDB is then provided or obtained by adapter 14.

In block B306, the initiator adapter 14 assigns an initiator XID X and inserts a cookie, $C_x$ (a first cookie). In block B308, the write CDB with the initiator XID X having the embedded cookie $C_x$ is sent to the target adapter 60. When the target adapter 60 is ready to accept data from the initiator adapter 14, in block B310, the target adapter 60 assigns a target XID Z and embeds a cookie $C_z$ (the second cookie) to a Xfer Rdy PDU.

In block B312, the Xfer Rdy PDU with the initiator XID X having cookie $C_x$ and the target XID Z having cookie $C_z$ is then sent by the target adapter 60 to the initiator adapter 14.

In block B314, the initiator adapter 14 extracts $C_x$ from the initiator XID X from the Xfer Rdy PDU. The initiator adapter 14 then sends data PDUs to the target adapter 60 with target XID Z and the embedded cookie $C_z$.

In block B316, the target extracts the cookie $C_z$ from the data PDUs and processes the data i.e. writes data to a storage location based on the write CDB. After the data is written, in block B318, target adapter 60 sends a status PDU with the initiator XID X having the embedded cookie $C_x$. In block B320, the initiator adapter 14 processes the status PDU and extracts the $C_x$ from the status PDU.

It is noteworthy that although the foregoing description describes both the initiator adapter and the target adapter inserting cookies, the embodiments disclosed herein are not limited to both adapter inserting cookies. For example, the initiator adapter may choose to embed a cookie in the initiator XID in a Command PDU and then extract the cookie from Xfer Rdy and Status PDUs that it receives from the target adapter. The target adapter may not embed any cookies in the target XID in Xfer Rdy PDU and hence does not receive any cookie in a data PDU it receives from the initiator adapter. Similarly, the target adapter may embed a cookie in a Xfer Rdy PDU and extract the cookie from the data PDU it receives from the initiator adapter. The initiator adapter may not insert any cookie in the initiator XID in the command PDU and hence does not receive any cookie in the Xfer Rdy and Status PDU it receives from the target adapter.

Figure 3B:
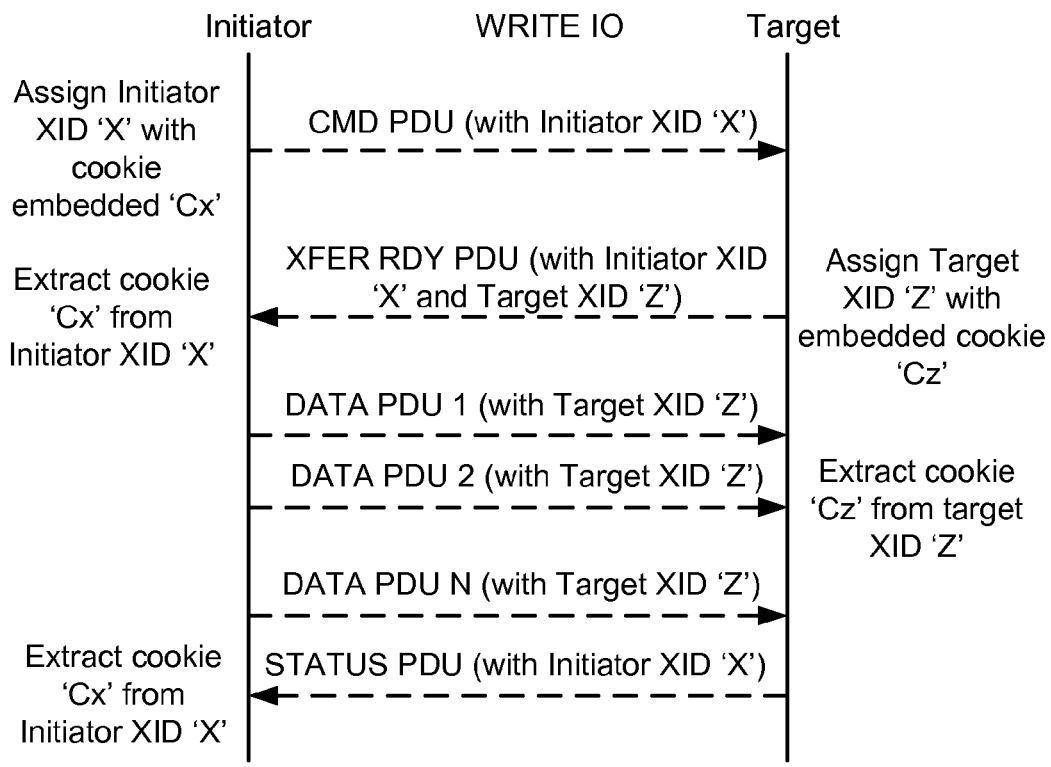
FIG. 3B shows an example of using the process of FIG. 3A.

FIG. 3B illustrates the various phases, i.e. command, transfer ready, data and status for processing a write CDB, according to one embodiment. The use of different XIDs and cookies as described above is also illustrated in FIG. 3B for clarity.

The following provides a mathematical representation of the using the cookies with XID with respect to processes 200, 300 and 400 (described below).

Assume that the XID X is the XID initially assigned to uniquely identify an IO exchange. 'C' is a cookie specific to the IO exchange. X can then be translated into a new XID 'Y' such that Y is a function of X and C (for example, Y=F(X, C) where Y is unique for each unique value of X. Thus, X and C can be extracted back from Y.

Instead of sending XID X, during process 300 (as well as process 200, where applicable) XID Y may be sent. The initiator adapter and the target adapter, whenever applicable, can extract C from Y. Similarly, X is extracted from Y for regular exchange level processing using the standard XID X.

In one embodiment, a cookie may be used for processing DIFs (data integrity fields). DIFs may be implemented in FC, FCoE, iSCSI or any other transport protocol carrying SCSI payload. DIFs are 8-byte fields appended to each block of data stored at a mass storage device. A DIF includes a Reference Tag, Application Tag, and a cyclic redundancy code (CRC) value. An incoming data stream may need to insert DIFs periodically, validate and remove DIFs from the data stream, or validate DIFs and keep them in the data stream.

DIF processing is typically performed by adapters that support, FC, FCoE, iSCSI and other protocol processing. Typically, adapter hardware executes the transport protocol stack. When the adapter receives PDUs, it has to determine if DIF processing is needed. The standard transport protocols, for example, FC, FCoE, ISCSI and others do not provide a mechanism by which an adapter can automatically determine if DIF processing is needed. In conventional systems, adapters maintain lookup tables to determine if DIF processing is needed and what type of DIF processing is required. This can be expensive because lookup tables take up memory space and use processing time. Furthermore, exchanges can be short-lived and hence lookup table may need to be updated regularly.

The embodiments disclosed herein provide a mechanism, where the cookies in XIDs are used for efficiently processing DIFs. A single DIF enabled/disabled bit may be used as an embedded cookie. The bit may be extracted from the XID to determine if DIF is enabled or disabled. The following provides an example of extracting the DIF bit, according to one embodiment.

Figure 3C:
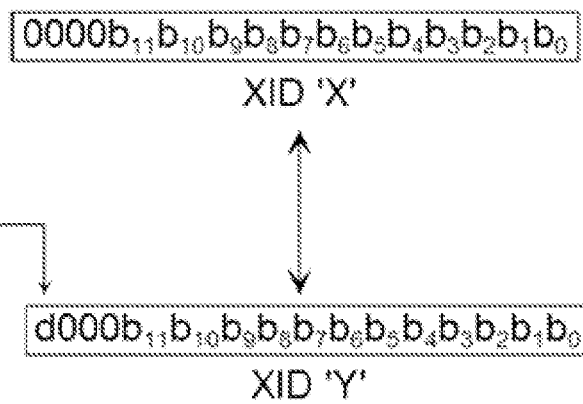
FIG. 3C shows an example of extracting a DIF bit.

Assume that XID is 16 bits wide as used under the FCoE protocol (iSCSI uses a 32 bit wide XID). Assume that a maximum number of outstanding exchanges are 4K, which is the typical number of outstanding exchanges per adapter port. In this case 12 bits out of 16 bits of XID may be used for 4K outstanding exchanges, while the remaining 4 bits may be unused. When the 4 unused bits are set to zero, the XID may range from 0 to 0xfff. Referring to FIG. 3C, an original XID 'X' uses bits $b_0$ to $b_{11}$, the 4 MSbits (most significant bits) are zero throughout the range. After you embed DIF enable/disable information 'D' in the MSBit, the XID 'X' is translated to Y, where Y=F(X, D). It is noteworthy that XID Y can be translated back to XID X using masking. Also DIF information 'D' can be extracted from 'Y' to disable or enable DIF processing.

Figure 4:
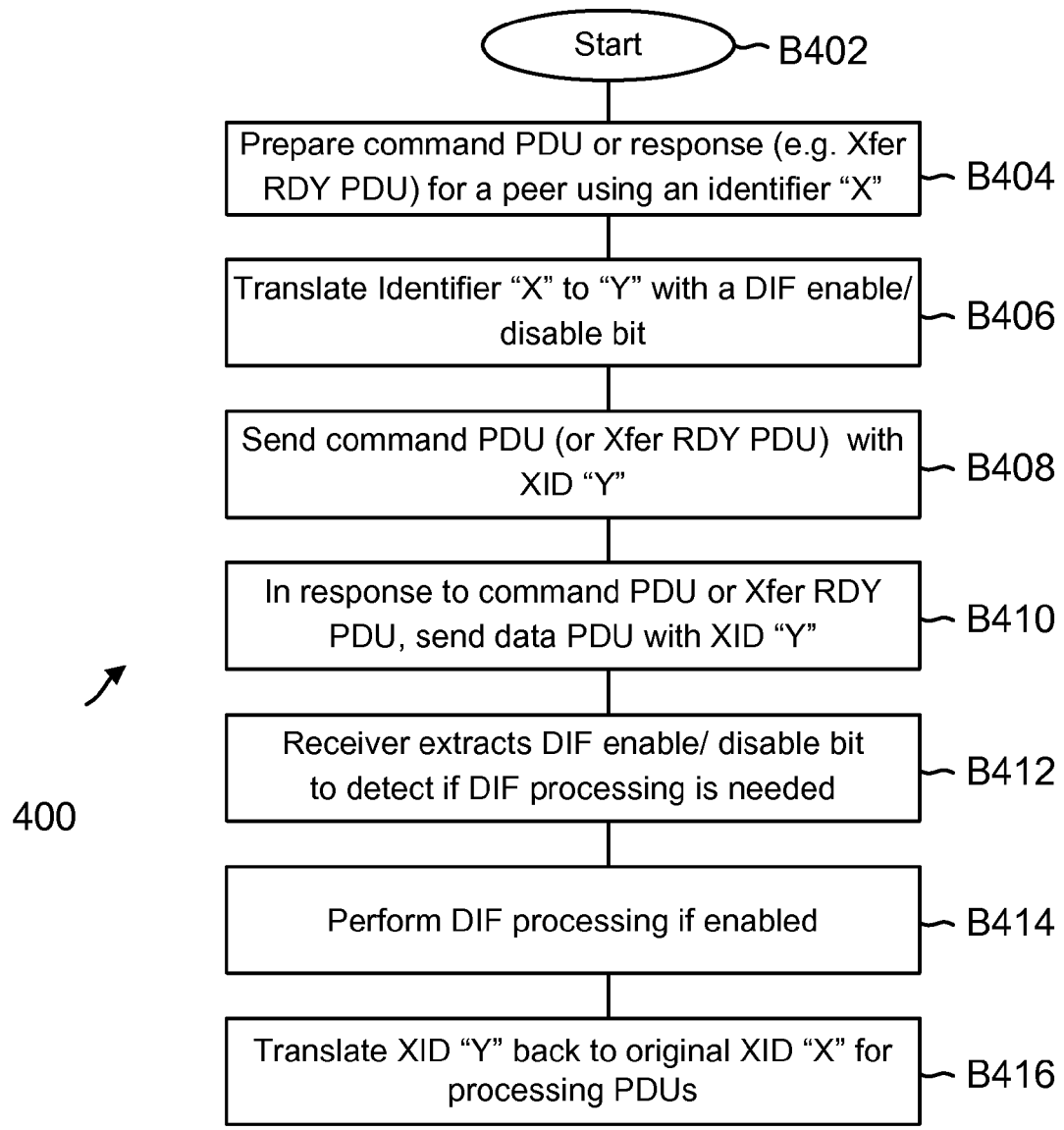
FIG. 4 shows a process for handling DIFs, according to one embodiment.

FIG. 4 shows a process 400 for using the DIF enable/disable bit during a read and/or write operation based on an I/O request, according to one embodiment. The process begins in block B402, when initiator adapter 14 and target adapter 60 are operational and communicating.

In block B404, an adapter (initiator or target) prepares a command PDU or a response (for example, a Xfer Rdy PDU) using an initiator XID X (or a target XID Z) for a peer. The term peer in this context means another adapter or device. For example, target adapter 60 is a peer of initiator adapter 14. In block B406, a DIF enable/disable bit is inserted. This translates XID X (or Z) to XID Y, as shown in the example, above.

In block B408, the command PDU (or a Xfer Rdy PDU) with XID Y is sent to the peer. In block B410, data PDUs are sent with XID Y. In block B412, the PDU receiver extracts the DIF enable/disable bit to detect if DIF processing is enabled or disabled. The receiver in this context may be the initiator or target adapter.

In block B414, the DIF processing is performed, if enabled. In block B416, the XID Y is translated to X for processing PDUs.

Process 400 described above may be applicable for read and write CDBs. In a read exchange, the initiator adapter initially assigns the initiator XID X which is a unique identifier for the exchange. The initiator adapter translates the XID X to XID Y after inserting DIF bit in X. The initiator adapter will send a Command PDU with XID Y to the peer adapter, i.e. the target adapter. The target adapter will respond by sending data PDUs which will have initiator XID Y. The initiator adapter thus receives data PDUs with the DIF bit in the XID. Based on the DIF bit, the initiator adapter determines whether to perform DIF processing or not. The initiator adapter can also extract and then use the original XID X for other exchange level lookups and processing.

Similarly, for a write exchange, after receiving a Xfer Rdy PDU from the target adapter, the initiator adapter sends data PDUs. In this case, during the Xfer Rdy phase, the target adapter assigns the target XID Z which is a unique identifier for the exchange. The target adapter will translate XID Z to XID Y after inserting a DIF bit in target XID Z. The target adapter then send a Xfer Rdy PDU with XID Y to the initiator adapter. The initiator adapter will respond by sending data PDUs with target XID Y. Thus the target adapter will receive data PDUs with the DIF bit in the target XID. Based on the target XID, the target adapter determines whether to perform DIF processing or not. The target adapter may also extract the original XID X for other exchange level lookups and processing.

As shown above, no lookup tables or expensive processing is needed for DIF processing. By using the DIF enabled/disable bit, the initiator and target can perform the necessary DIF processing.

The adaptive embodiments described herein are not limited to DIF processing. For example, the cookies described herein may be used to extract exchange specific parameters for which a transport protocol has to perform a look-up operation. The cookie may also be used to assist in the lookup for example, if the lookup table is a hash table, then the cookie may be used to provide a hash value.

In yet another embodiment, cookies may be used to perform load balancing and/or improve cache efficiency. For example, the cookie may be used to store processor information so that when PDUs are received; a processor or any other hardware component is selected based on the cookie i.e. by evaluating the XID. It is noteworthy that this application will occur where there are multiple processors/hardware components at the initiator adapter and/or the target systems.

The cookies may also be used to prioritize PDU processing. For example, the cookie may be used to carry priority information or "queue" information. The queues are maintained by the adapters/computing system to queue information for processing.

In one embodiment, a small I/O may be processed differently than a large I/O. The term "small" and "large" may be based on an amount of data that is transferred within an exchange. As an example, typically for small IOs the requested data may be "small" in size, for example, a few hundred bytes to a few kilobytes. In contrast, in large IOs the requested data size is "large", for example, in the order of hundreds of kilobytes to a few megabytes or more. A storage administrator may be able to programmatically define a small I/O and a large I/O.

Small I/Os typically are concerned with latency, while large I/Os are more concerned with throughput. For small I/Os, the objective is to maximize the number of I/O operations within a unit time (i.e. reduce latency). In small I/Os, there are fewer data PDUs along with a single status PDU, for example, there may only be a single data PDU and a single status PDU. To reduce latency for small I/Os, it is desirable to quickly return data and status to reduce latency. Thus for a small I/O, the adapter may skip some of the exchange state maintenance that is performed for large I/Os case, for example keeping an account of a number of bytes received, DMA offsets and updating the information in an exchange state maintenance data structure (not shown) for received every PDU.

Another optimization that may be performed by the initiator adapter for a small I/O read operation may be that the initiator adapter can anticipate the status PDU to be coming next as soon as the single data PDU is received for an exchange and then prepare for sending status to the SCSI layer early, without actually waiting for status PDU to be received. With this, the initiator adapter will be able to reduce latency by sending status to SCSI layer immediately after the anticipated good status PDU is received.

For large I/Os, the objective is to maximize the amount of data processed in unit time (referred to as throughput). A large IO will typically have a large number of data PDUs coming in at a fast throughput rate (bytes/sec) and a single status PDU. For such IOs, the adapter may have to first buffer (i.e. temporarily store) the data PDUs before you presenting the data to a SCSI layer for processing.

Thus small I/Os may be processed differently than large I/Os. The cookies described above may be used to identify an I/O request as a small I/O or a large I/O such that a receiving adapter can extract the cookie and process the I/O differently i.e. appropriately.

It is noteworthy that the cookie described above may be used for multiple functions, for example, one bit may be used for enabling or disabling DIF processing, another bit can be used to detect large IO and small I/O and another bit can be used for identifying a designated processor (or hardware component) for processing an exchange. The embodiments described herein are not limited to any particular use of the cookie.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method, comprising;
    initiating a read command by an initiator adapter coupled to a computing system and communicating with a target adapter coupled to a target controller managing a plurality of storage devices;
    assigning an exchange identifier for processing the read command and embedding a cookie in the exchange identifier for performing a function;
    receiving a data protocol data unit (PDU) with the exchange identifier with the embedded cookie from the target adapter at the initiator adapter; and
    extracting the cookie from the exchange identifier received with the data protocol data unit.

2. The method of claim 1, further comprising:
    receiving a status PDU with the cookie in the exchange identifier from the target adapter at the initiator adapter; and extracting the cookie from the exchange identifier received by the initiator adapter from the target adapter.

3. The method of claim 1, wherein the cookie is used to enable or disable data integrity fields for processing the data PDU at the initiator adapter.

4. The method of claim 1, wherein the cookie is used to identify a large and small input/output operation at the target adapter and at the initiator adapter.

5. The method of claim 4, wherein the initiator adapter is a Fibre Channel over Ethernet adapter or an Internet over Small Computer System Interface based adapter.

6. The method of claim 1, wherein the cookie is used identify a designated processor to which a received response PDU is routed.

7. The method of claim 1, wherein the cookie is used to prioritize protocol data unit processing at the initiator adapter.

8. A machine implemented method, comprising;
    initiating a write command by an initiator adapter coupled to a computing system and communicating with a target adapter coupled to a target controller managing a plurality of storage devices;
    assigning a first exchange identifier by the initiator adapter for processing the write command and embedding a first cookie in the exchange identifier for performing a function;
    receiving a response from the target adapter at the initiator adapter with the first cookie and the first exchange identifier and a second cookie embedded in a second exchange identifier assigned by the target adapter for a response phase, the response indicating that the target adapter is ready to receive data for the write command;
    sending a data protocol unit to the target adapter with the second exchange identifier and the second cookie;
    extracting the second cookie from the data protocol unit and processing the data protocol data unit by the target adapter;
    sending a status protocol data unit from the target adapter to the initiator adapter with the first exchange identifier and the first cookie; and
    extracting the first cookie from the first exchange identifier received with the status protocol data unit by the initiator adapter from the target adapter.

9. The method of claim 8, wherein the first cookie and the second cookie can be used to enable or disable data integrity fields for processing the write command at the initiator adapter and the target adapter.

10. The method of claim 8, wherein the first cookie and the second cookie can be used to identify a large and small write operation at the target adapter and at the initiator adapter.

11. The method of claim 8, wherein the initiator adapter is a converged adapter that can process storage traffic and network traffic.

12. The method of claim 8, wherein the initiator adapter is a Fibre Channel over Ethernet adapter or an Internet over Small Computer System Interface based adapter.

13. The method of claim 8, wherein the cookie is used identify a designated processor to which a received response PDU is routed.

14. The method of claim 8, wherein the first cookie and the second cookie is used to prioritize protocol data unit processing at the initiator adapter and the target adapter.

15. A system, comprising;
    an initiator adapter coupled to a computing system and communicating with a target adapter coupled to a target controller managing a plurality of storage devices;
    wherein the initiator adapter initiates an input/output (I/O) request for the target adapter; assigns an exchange identifier for processing the I/O request and embeds a cookie in the exchange identifier for performing a function; and wherein the target adapter sends a response to the I/O request to the initiator adapter with the exchange identifier and the cookie; and the initiator adapter extracts the cookie from the exchange identifier received from the target adapter.

16. The system of claim 15, wherein the cookie is used to enable or disable data integrity fields for processing the I/O request at the target adapter and at the initiator adapter.

17. The system of claim 15, wherein the cookie is used to identify a large and small I/O operation at the target adapter and at the initiator adapter.

18. The system of claim 15, wherein the cookie is used to prioritize protocol data unit processing at the target adapter and at the initiator adapter.

19. The system of claim 18, wherein the initiator adapter is a Fibre Channel over Ethernet adapter or an Internet over Small Computer System Interface based adapter.

20. The system of claim 15, wherein the initiator adapter is a host bus adapter.

* * * * *